(12) United States Patent
Feyrer

(10) Patent No.: US 6,792,845 B2
(45) Date of Patent: Sep. 21, 2004

(54) LINEAR DRIVE UNIT

(75) Inventor: Thomas Feyrer, Esslingen (DE)

(73) Assignee: Festo AG & Co., Esslingen (DE)

( * ) Notice: Subject to any disclaimer, the term of this patent is extended or adjusted under 35 U.S.C. 154(b) by 43 days.

(21) Appl. No.: 10/220,663

(22) PCT Filed: Feb. 1, 2001

(86) PCT No.: PCT/EP01/01073

§ 371 (c)(1),
(2), (4) Date: Aug. 30, 2002

(87) PCT Pub. No.: WO01/68315

PCT Pub. Date: Sep. 20, 2001

(65) Prior Publication Data

US 2003/0029313 A1 Feb. 13, 2003

(30) Foreign Application Priority Data

Mar. 17, 2000 (DE) .......................................... 100 13 195

(51) Int. Cl.⁷ ............................................... F16J 15/18
(52) U.S. Cl. ................................ 92/165 R; 92/165 PR
(58) Field of Search ................................ 92/88, 165 R, 92/165 PR

(56) References Cited

U.S. PATENT DOCUMENTS

| 3,994,539 A | 11/1976 | Gottlieb |
| 4,013,280 A | 3/1977 | Chitayat et al. |
| 4,701,058 A | 10/1987 | Mottate |
| 4,726,283 A | 2/1988 | Miyamoto |
| 4,829,880 A | 5/1989 | Lieberman |
| 5,328,269 A | 7/1994 | Mutolo et al. |

FOREIGN PATENT DOCUMENTS

| DE | 42 30 781 | 3/1994 |
| DE | 42 42 601 | 6/1994 |
| DE | 297 10 935 | 10/1998 |
| EP | 0 533 922 | 3/1993 |
| EP | 0 603 459 | 6/1994 |
| EP | 0 698 744 | 2/1996 |
| EP | 0 704 275 | 4/1996 |
| FR | 1552415 | 1/1969 |
| FR | 2206542 | 6/1974 |
| GB | 2 178 983 | 2/1987 |

*Primary Examiner*—Edward K. Look
*Assistant Examiner*—Michael Leslie
(74) *Attorney, Agent, or Firm*—Hoffmann & Baron, LLP

(57) ABSTRACT

A linear drive unit (1) possesses a first principal body (2) with a U-like section part (4) and furthermore a second principal body (3) with a drive housing (7). Using at least one drive means the two principal bodies (and 3) may be driven to perform a linear relative movement. The section part (4) straddles the drive housing (7), its longitudinal limbs (5a and 5b) being opposite to the side faces (13a and 13b) of the drive housing (7) with the intermediate placement of linear guide means. The section part (4) comprises two section elements (23a and 23b) each having one of the limbs (5a and 5b), such section elements being firmly joined together and being placed opposite to each other alongside each other setting the guide play of the linear drive means.

25 Claims, 4 Drawing Sheets

LINEAR DRIVE UNIT

FIELD OF THE INVENTION

The invention relates to a linear drive unit comprising a first principal body having a section part, which is U-like in cross section, a second principal body, which has a housing (drive housing), said housing being placed at the U-like opening of the section part with the placement therebetween of linear guide means permitting a guided linear relative movement, and at least one drive space in the interior of the drive housing, such drive space containing components of a drive means projecting on at least one terminal side of the second principal body and engaging the associated axial terminal region of the first principal body, and on activation thereof the linear relative movement is caused between the two principal bodies.

BACKGROUND OF THE INVENTION

In the case of a linear drive unit of this type disclosed in the European patent publication 0 603 459 A2 the slide-like first principal body has its U-like section part set on the top side of the drive housing of the second principal body straddling a guide rail mounted on the top side of the drive housing. In the principal body two drive spaces are formed, which each house components of a fluid operated drive means, which are connected with the one axial terminal region of the first principal body. By activation of the drive means a linear relative movement may be produced between the principle bodies, linear guide means placed between the two principal bodies serving to provide for guidance of the movement.

One disadvantage of the known linear drive unit resides in the fact that the guide play of the linear guide means is relatively difficult to adjust. As a rule such adjustment is performed by resetting the position of the components, running of the section part of the first principal body, in relation to the principal body. On the one hand this means having suitable adjustment means, something which increases the costs of production of the linear drive unit. On the other hand the adjustment is relatively complex, because the linear guide means are covered over by the U-like section part of the first principal body and therefore are only to be accessed or seen with difficulty.

SUMMARY OF THE INVENTION

One object of the present invention is to provide a linear drive unit, which despite having an economic price is simple and exact as regards adjustment.

In order to achieve this aim there is a provision such that the section part of the first principal body straddles the drive housing of the second principal body so that its longitudinal limbs flank the lateral side faces of the drive housing, the linear guide means being arranged between each limb of the section part and the facing lateral face of the drive housing, and that the section part comprises two section elements which respectively comprise one of the limbs and are firmly fitted together so as to set the guide play of the linear drive means alongside each other.

Accordingly a linear drive unit is provided, in the case of which during assembly of the U-like section part the guide play of the linear guide means can be simultaneously automatically set so that later complex adjustment work is unnecessary and it is possible to use inexpensive linear guide means, which for their part do not have any special play adjustment means. The limbs, which flank the drive housing, of the U-like section part are components of originally separate section elements, which during assembly of the linear drive unit are placed alongside each other, so that initially they are freely movable and slidable in relation to each other and the width of the intermediate space between their limbs may be varied and set by predetermining different relative positions. Since the set width of the intermediate space directly influences the guide play of the linear guide means placed between each respective limb and the drive housing, it is therefore possible to preset the desired guide play by the selected positioning and biasing effect very simply. By then firmly joining together the section elements, as for instance by bonding, the setting produced will be permanently maintained so that later adjustment will not be necessary. More particularly in the case of linear drive units with small and miniature dimensions the product design in accordance with the invention exhibits unique advantages, because in this case formerly owing to the miniaturized structure manipulations could only be performed in an extremely awkward manner if at all.

Further advantageous developments of the invention are defined in the dependent claims.

The linear guide means are preferably designed in the form of rolling element guides and possess guideways provided on each limb of the section part and on the facing lateral faces of the drive housing, such guideways cooperating with intermediately placed rolling elements. The latter can in this case be grouped together as rolling element units.

The section elements constituting the section part are preferably L-like in cross section and so put together that they overlap at pairs of their L-like limbs. In the overlap part it is possible for the L-like limbs to be bonded together or joined together in some other fashion.

In the case of a particularly advantageous design the drive housing is provided with two juxtaposed drive spaces for each on drive unit, the two drive units being able to engage at the same axial end region or at two opposite end regions of the first principal body. The last named design is more particularly to be employed in connection with a first principal body which is long in relation to the overall length of the second principal body, the second principal body being overlapped at both oppositely facing terminal faces by the first principal body.

The drive units may be so designed that each of them is responsible for the production of the linear relative movement in only one of the two possible directions of motion. It is particularly advantageous for this to be in conjunction with a design of the drive means in a fluid operated system, since here the number of seals is substantially reduced.

Each respective drive means has, in the case of a fluid operated design, preferably a piston which is arranged in a sliding manner in an associated working space in the drive housing, said piston engaging the respective terminal axial end region of the first principal body by way of a force or power transmitting part, which extends longitudinally. In this case the power transmitting part may be annular in design and, in order to favor simple production, constitutes a sort of plunger piston together with the piston.

In the case of a component unit designed in a hollow form there is the possibility of accommodating an abutment unit in the interior of the piston and/or of the force transmitting part, said unit being able to be used to set the terminal position of the piston and accordingly of the relative movement produced by it. The abutment unit will conveniently have a variably positionable abutment part in order to set different terminal positions of the piston as may be required.

Resetting the terminal position of the piston is preferably performed through an opening provided at the end of the force transmitting part opposite to the piston, such opening permitting the introduction of a suitable setting tool.

The abutment unit may be provided with a buffer and/or damping means in order to reduce the terminal impact.

It is convenient for the respective-drive means to engage the respective axial terminal region of the first principal body by the intermediary of a transverse part, such transverse part extending in the intermediate space between the two limbs of the section part and preferably being anchored also on both limbs. This transverse part may more particularly be plate-like and be so aligned that the plane of its plate is perpendicular to the longitudinal axis of the first principal body.

It is more especially advantageous for the transverse part to so interlock with the two limbs that between it and the section part play-free force transmission is possible, and at least a small degree of play permitting movement being present between the transverse part and the limbs in the transverse direction, such play existing simultaneously on assembly of the section elements and/or on permanent fitting together of same. This means that there is a play-free transmission of the drive forces, there at the same time being an exact, aligned arranged of all components, something which prevents excessive wear. It is possible to have such a provision that the transverse part is floatingly mounted on the section part athwart the latter, either by leaving a certain space for play or by integration of elastically yielding compensation means.

In the following the invention will be described in detail with reference to the accompanying drawings.

DETAILED DESCRIPTION OF THE PREFERRED EMBODIMENTS

Figure 1:
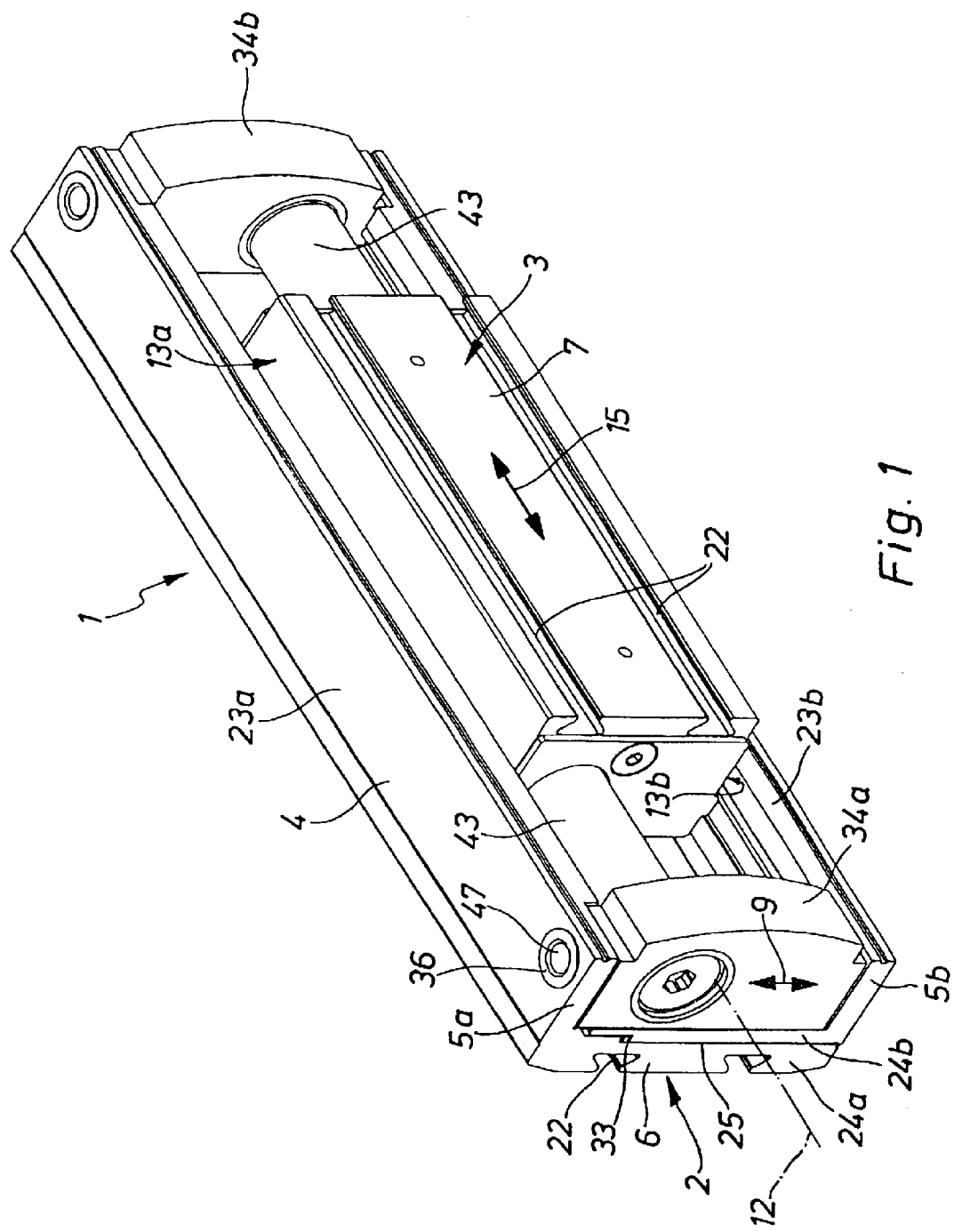
FIG. 1 shows a preferred embodiment of the linear drive unit in accordance with the invention in a perspective view.
Figure 2:
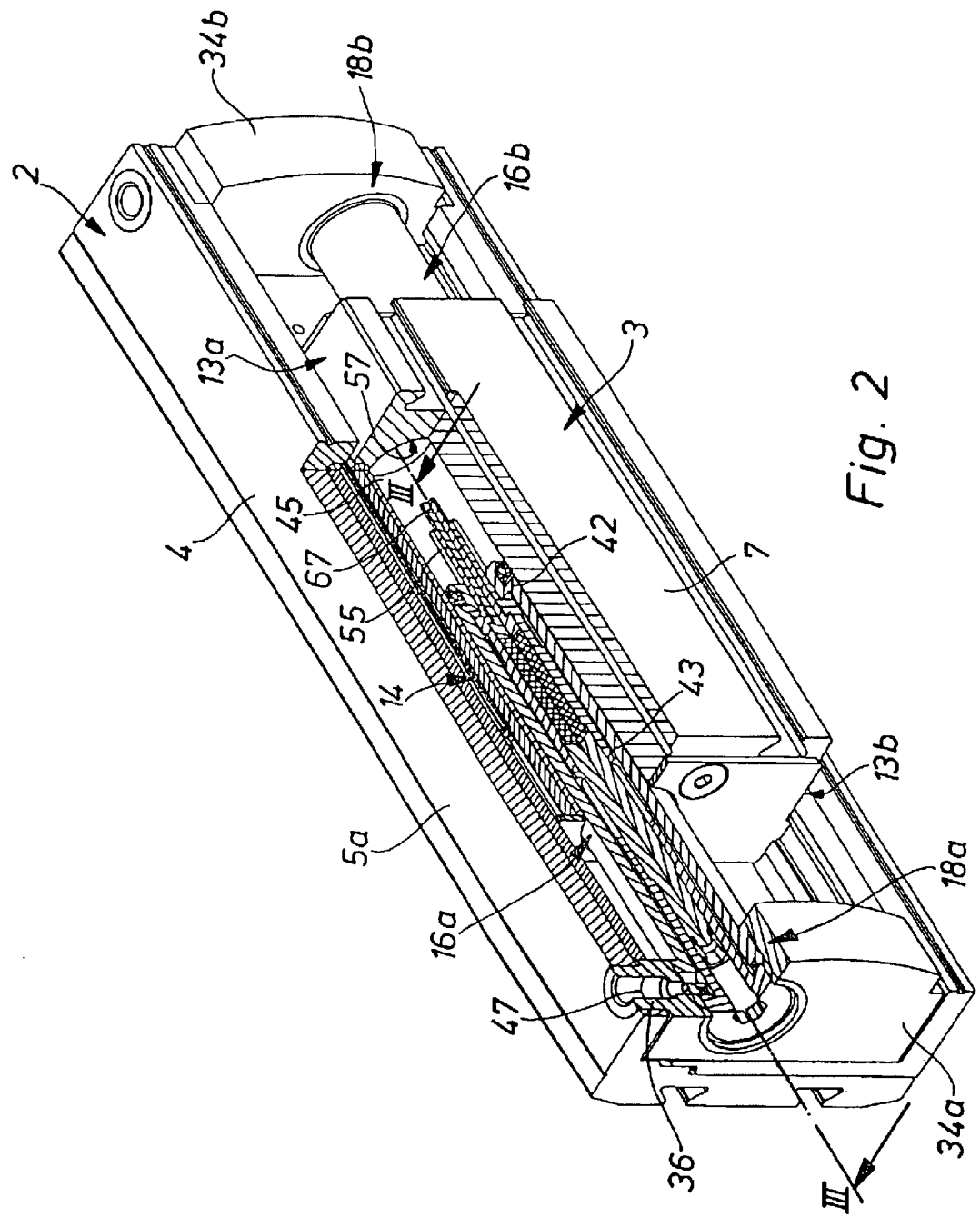
FIG. 2 shows the linear drive unit of FIG. 1 partially broken away at one drive means.
Figure 3:
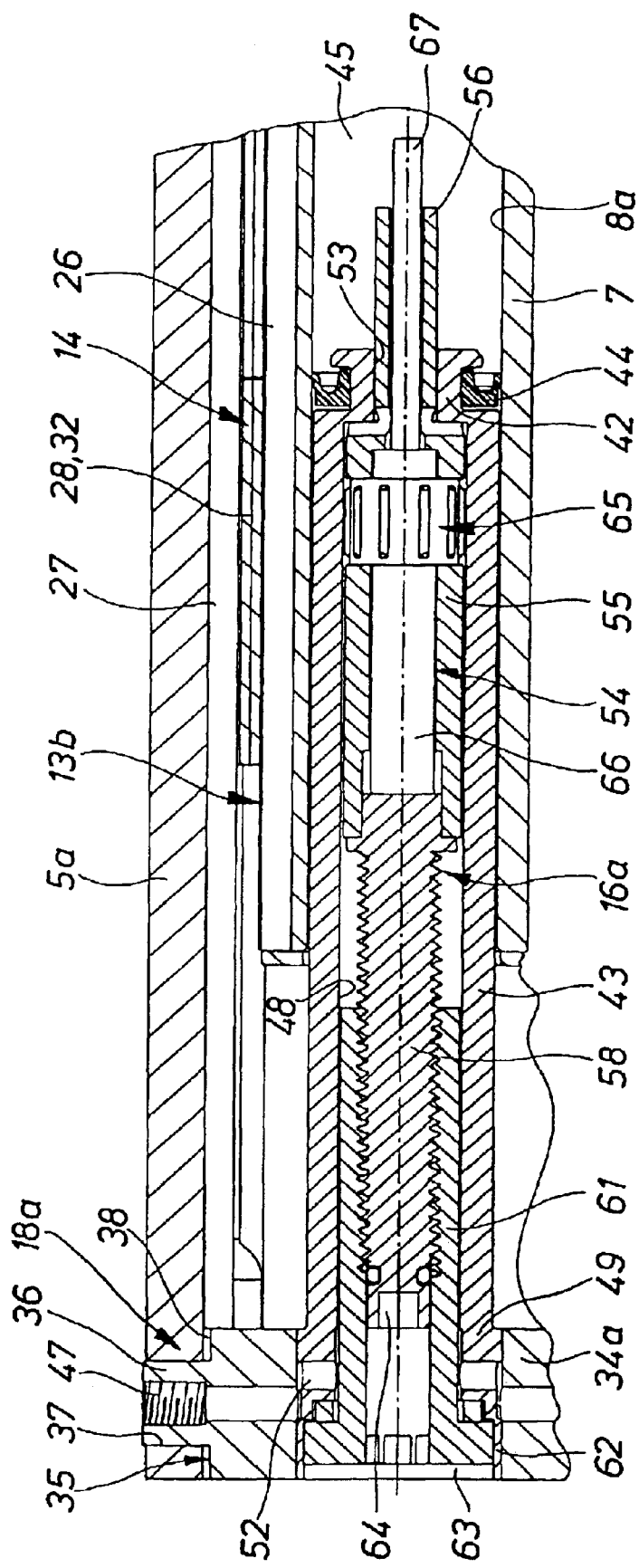
FIG. 3 shows a longitudinal section taken through the linear drive unit in the part, which is shown partially broken away in FIG. 2, on the line III—III.
Figure 4:
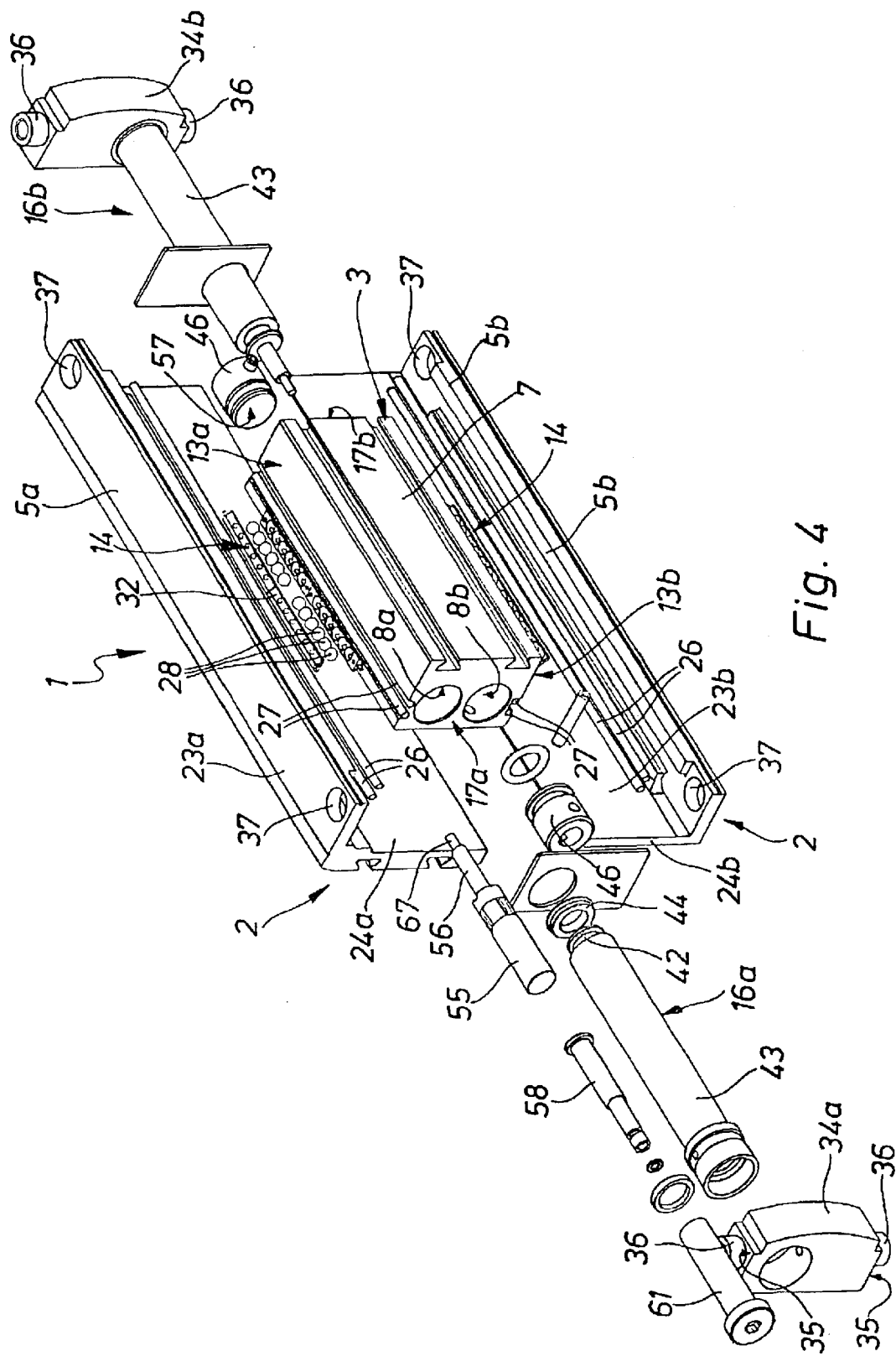
FIG. 4 is an exploded elevation of the principal components of the linear drive unit of FIGS. 1 through 3.

The linear drive unit 1 illustrated by way of example possesses an elongated first principal body 2 and a second principal body 3 having a shorter overall length in comparison with the first principal body 2.

The first principal body 2 has an elongated section part 4, having a U-like cross section, with two limbs 5a and 5b placed opposite each other in the transverse direction and with a spacing between them and furthermore a rib 6 connecting them.

In the working embodiment illustrated the second principal body 3 comprises a block-like, elongated housing, which will be termed a drive housing 7 and which in the interior has two drive space 8a and 8b which are adjacent to each other and parallel, such drive spaces having a longitudinal extent. The longitudinal extent of the drive space 8a and 8b is parallel to the longitudinal axis 12 of the linear drive unit 1, such longitudinal axis 12 also representing the longitudinal axes of the two principal bodies 2 and 3.

The section part is so mounted on the second principal body 3 with its U-like opening to the fore that it straddles the drive housing 7 thereof, its limbs 5a and 5b on the longitudinal side flanking the two facing side faces 13a and 13b of the drive housing 7 with a clearance.

Between each limb 5a and 5b and the facing lateral face 13a and 13b of the drive housing 7 there are linear guide means 14 ensuring a guided linear relative movement between the two principal bodies 2 and 3. The resulting possible directions of motion, which are mutually opposite, coincide with the alignment of the longitudinal axis 12 and are indicated by the double arrow 15.

In order for the linear drive unit to fulfill its function it is provided with at least one and preferably at least two drive means 16a and 16b. Since the design of these two drive means 16a and 16b is identical only one of them is illustrated in detail in the drawing. References to this drive means 16a are simultaneously to be understood as references to the other second drive means 16b to the extent that in a particular case nothing is stated to the contrary.

Each of the two drive spaces 8a and 8b is provided with one of the drive means 16a and 16b, the latter being partially received in the respective drive space 8a and 8b. It extends past one of the two axially aligned terminal faces 17a and 17b out from the drive space 8a and 8b and engages the oppositely placed axial terminal region 18a and 18b of the first principal body 2. By activation of the drive means 16a and 16b it is consequently possible for the linear relative motion to be brought about.

During use the linear drive unit 1 is stationarily fixed either on the first principal body or on the second principal body 2 and 3, whereas a means, or respectively a component, to be moved is secured to the other principal body. Both principal bodies 2 and 3 do for example have groove-like attachment means 22, which permit connection with a holding structure or with an object to be moved.

The particular design of the linear drive unit 1 renders possible especially simple manufacture. During assembly of the section part 4 automatic setting of the guide play of the linear guide means may take place in order to obtain the minimum possible play in the linear guiding action two principal bodies 2 and 3.

In order to make this possible the U-like section part 4 comprises two section elements 23a and 23b, each having one of the limbs 5a and 5b, such section elements 23a and 23b being placed alongside one another longitudinally and being firmly joined together.

The putting together and joining together of the section elements 23a and 23b is conveniently performed with the drive housing 7 and the linear guide means 14 placed between the limbs 5a and 5b, which are initially are further moved apart from one another. During assembly the limbs 5a and 5b, which are initially held still further apart, are moved toward each other in the transverse direction 9 so that the distance between them is reduced and the linear guide means 14 are moved more and more between the limbs 5a and 5b and the drive housing 7 with a biasing effect. The desired biasing effect of the linear guide means 14 may consequently be set readily directly as part the fitting of the section part 4.

The two section elements 23a and 23b are preferably of L-like cross section so that they may be termed angle sections, which are so placed together that they have their first L-like limbs 24a and 24b overlapping in the transverse direction 9. The degree of overlap may be essentially the same as the width of the intermediate space defined between the two limbs 5a and 5b. The overlap zone defines a large joint area 25, wherein first L-like limbs 24a and 24b rest against one another and are firmly and preferably permanently joined together, preferably by bonding.

The firm and rigid joining together of the two section elements 23a and 23b could also be done using other suitable joining methods, as for example by welding or with the alternative or additional use of attachment elements such as screws or rivets.

The configuration of the two section elements 23a and 23b is such that the optimum setting of the guide play is obtained, before the section elements 23a and 23b abut one another in the transverse direction 9. This is for instance done by providing a minimum distance 33, extending along the entire length of the section part, between the two first L-like limbs 24a and 24b in the direction of overlapping, which corresponds to the transverse direction 9. The first L-like limbs 24a and 24b accordingly do not abut on the respectively other section element.

The linear guide means 14 are conveniently designed in the form of rolling element or anti-friction bearing means and in the working example here possess pairs of bearing rods 26 and 27 arranged on one limb 5a and 5b and on the lateral face 13a and 13b, facing it, of the drive housing 7, such bearing rods 26 and 27 defining guide tracks, which cooperate with intermediately placed rolling elements 28. The latter may roll on the guide tracks during the relative movement of the two principal bodies 2 and 3 on the guide tracks. It is convenient for the rolling elements 28 to be set in groups by cages 32 or the like as rolling element units.

In the working embodiment illustrated the drive means 16a and 16b do not directly engage the section part 4 but a transverse part 34a and 34b belonging to the first principal body 2, such transverse part 34a and 34b being fitted between the two limbs 5a and 5b of the section part 4 and being also anchored to these limbs 5a and 5b.

The two drive means 16a and 16b are so installed in the working example that as regards the first principal body 2 they only engage its axial terminal regions 18a and 18b, the one drive means 16a being in engagement with one axial terminal region 18a and the other on the other axial terminal region 18b of the first principal body 2. Accordingly the first principal body 2 is provided at both axial terminal regions 18a and 18b with a transverse part 34a and 34b, which is preferably designed like a block or plate and is inserted between the two limbs 5a and 5b with the plane of extent 8 aligned to be perpendicular to the longitudinal axis 12. It would be possible to term the transverse parts 34a and 34b lids or covers, since they surround the intermediate space delimited longitudinally by the limbs 5a and 5b.

Each transverse part 34a and 34b has terminating faces 35 facing the limbs 5a and 5b and aligned to be oppositely orientated, at least one of such faces having a preferably cylindrically shaped pin 36 extending away from the it. Each of such pins 36 is in the associated limb 5a and 5b provided with an aligned, complementarily shaped recess 37 preferably in the form of a through opening, into which the associated pin 36 fits without play.

Owing to the pins 36 and recesses, which are in engagement with each other, there is an interlocking anchoring effect for the transverse part 34a and 34b on the section part 4 so that between the respective transverse part 34a and 34b and the section part 4 force transmission free of play is possible in the directions 15 of the linear relative movement.

Furthermore the dimensions of the transverse parts 34a and 34b are also so selected in the transverse direction 9 that the distance apart between the terminating faces 35 provided on same is less than the distance apart of the inner faces of the two limbs 5a and 5b in the assembly region of the transverse part 34a and 34b. This means that the setting of the guide play of the linear guide means 14 is not locked by the intermediately placed parts 34a and 34b. In fact, owing to the distance difference an intermediate space 38 is set between a respective transverse part 34a and 34b and the limbs 5a and 5b, such difference rendering it possible for the transverse part 34a and 34b to maintain an exact alignment as regards the engaging drive means 16a and 16b during assembly irrespectively of the relative position of the section elements 23a and 23b. It is in this manner that skew running and premature wear are prevented. In the working embodiment illustrated the transverse parts 34a and 34b are at all times mounted in a floating manner as regards the transverse direction 9 of the section part 4 so that even errors in alignment occurring during linear relative motion are automatically allowed for. The intermediate space 38 in this case ensures the necessary freedom of motion. As an alternative however elastic means could be present as well to ensure freedom of transverse movement.

As a rule it will however be sufficient to ensure the necessary-movement play during assembly of the first principal body 2. The transverse parts 34a and 34b will accordingly align themselves automatically and may in fact be fixed in the position arrived at by bonding or some other measure in addition.

The linear drive unit 1 could readily be fitted with electrically activated drive means. In the working embodiment however fluid operated drive means 16a and 16b are employed, whose design will be described in more detail in the following with reference to the one drive means 16a.

Each drive means 16a and 16b comprises an associated piston 42 sliding in a preferably cylindrically shaped drive space 8a and 8b, such piston being joined by means of a force transmitting part 43 with the associated transverse part 34a and 34b rigidly. In the drive space 8a and 8b on the side opposite to the force transmitting part 43 the piston 42, which is provided with a seal 44, delimits an actuating chamber 45, which at the other end is closed in a sealed manner by cover 46. On feeding a fluid pressure medium, more particularly compressed air, into the actuating chamber 45 of one of the two drive spaces 8a and 8b, and simultaneous venting of the actuating chamber 45 of the other drive space, there will be a linear relative movement of the two principal bodies 2 and 3 in the one direction of motion. In the case of a reverse action of pressure and of venting the direction of motion will be changed. This means that each drive means 16a and 16b in the working example is responsible for the production of the linear relative movement in only one of the two possible directions 15 of movement. This simplifies the structure, because the seal 44 arranged on the piston 42 only has to seal off one point at which a dynamic sealing function is mandatory.

The supply and removal of the pressure medium is preferably performed through the structural unit comprising the force transmitting part 43 and the piston 42, that is to say starting from that axial terminal zone 18a and 18b, at which the force transmitting member 43 is attached. The associated connection opening 47 is best located on the transverse part 34a and 34b and may here be formed in one of the pins 36. In the working embodiment both pins 36 are provided with a connection opening 47 in order to have a selective connection possibility for pressure lines.

The above mentioned structural unit comprising the piston 42 and the force transmitting member 43 has a tube structure so that an axially extending cavity 48 is produced possibly having a stepped cross section, which communicates with a terminal part 49, firmly mounted in a sealed manner in the transverse part 34a and 34b, of the force transmitting part 43 by way of one or more transverse holes 52 with the connection opening 47. The connection with the actuating chamber 45 constitutes a through hole 43.

The structural unit comprising the piston 42 and the force transmitting member 43 is preferably of unitary design and reassembles a plunger piston, the outer cross section of the force transmitting member 43 being the same as that of the piston 42 so that the length section, which is moved into the drive space 8a and 8b, of the structural unit is supported in an optimum manner in the transverse direction.

The cavity 48 may be conveniently employed in order to accommodate an abutment unit 54 as illustrated. It renders possible a variable setting of the terminal position of the piston 42 in the inward direction of movement in the working example.

The inserted cartridge-like abutment unit 54 comprises an elongated head piece 55, which has an abutment part 56 of reduced diameter fitting through the through hole 53 and extending into the actuating chamber 45. It is axially opposite to a strike face 57 which is conveniently provided on the opposite terminating cover 46.

A screw threaded body 58 is provided on the rear side of the head piece 51, said rear side being opposite to the abutment part 56, such body 58 being screwed into a holding element 61 which is hollow from end to end and is locked for its part by a threaded connection 62 or some other firm connection in the cavity 48 of the force transmitting part 43 so that it cannot be turned.

A screw driver may be inserted through the outer opening 63, facing away from the second principal body 3, in the force transmitting part 43, into the hollow holding element 61 and the screw driver may engage a tool socket 64 or nut provided at the adjacent end of the threaded body 58. By turning the threaded body 58 in relation to the axially fixed holding element 61 it is possible for the axial position of the head piece 55 and accordingly of the abutment part 56 to be changed in relation to the piston 42. Accordingly it is possible for that relative position of the two principal bodies 2 and 3 to be influenced, at which same assume a terminal position owing to engagement of the abutment part 56 and the strike face 57.

The abutment unit 54 is in the working example preferably in addition fitted with a damping means 65. Same is seated in the interior of the hollow head piece 51 and in the working embodiment illustrated contains a fluid shock absorber 66, whose fender-like plunger part in the form of the force transmitting element 67 extends coaxially through the tubular abutment part 56 and projects past it a little toward the strike face 57.

On drawing near the terminal position the force transmitting element 67 firstly comes up against the strike face 57 so that the speed of the relative movement is reduced, before finally the abutment part 56 also comes into engagement with the strike face 57 to set the position.

Instead of a damping means 65 it would also be possible to have a plain buffer means, in the case of which the force element 67 would act on a rubber-like elastic yielding buffer body.

In order to ensure a particularly flat design the drive spaces 8a and 8b and accordingly the drive means 16a and 16b are arranged in a common plane, which extends in parallelism to the plane of extent of the connecting rib 6 of the section part 4.

In principle it would be possible for the linear drive unit 1 also to have only one drive space and an associated drive means. Furthermore each drive means present could simultaneously engage both axial terminal regions 18a and 18b of the first principal body 2, a force transmitting member then engaging the two axial ends of the piston 42. In the working embodiment illustrated however the above mentioned advantages are produced as regards the reduced number of seals in connection with a particularly compact structure in the length direction as well.

What is claimed is:

1. A linear drive unit comprising a first principal body having a section part, which is U-like in cross section, a second principal body, which has a drive housing, said housing being placed at the U-like opening of the section part with the placement therebetween of linear guide means permitting a guided linear relative movement, and at least one drive space in the interior of the drive housing, such drive space containing components of a drive means projecting on at least one terminal side of the second principal body and engaging the associated axial terminal region of the first principal body, and on the activation thereof the linear relative movement is caused between the two principal bodies, wherein the section part of the first principal body straddles the drive housing of the second principal body so that its longitudinal limbs flank the lateral side faces of the drive housing, the linear guide means being arranged between each limb of the section part and the facing lateral face of the drive housing, and in the section part comprises two section elements which respectively comprise one of the limbs and are firmly fitted together so as to set the guide play of the linear drive means alongside each other, and wherein the at least one drive means is designed in the form of a fluid operated drive means and possesses a piston arranged in the associated drive space, such piston engaging, by the intermediary of a force transmitting part having a longitudinal extent, the respective axial terminal region of the first principal body, and wherein the force transmitting part is hollow from end to end, and wherein at least one of the piston and the force transmitting part has an abutment unit, which on the side facing away from the force transmitting unit has an abutment part extending out of the piston, which part can cooperate with an oppositely placed strike face on the housing in order to preset a terminal position on the piston.

2. The linear drive unit as set forth in claim 1, wherein the abutment part is able to be set axially to set different terminal positions of the piston in relation to the piston or respectively in relation to the force transmitting part.

3. The linear drive unit as set forth in claim 2, wherein the force transmitting has an opening at its end opposite to the piston, such opening rendering possible the introduction of an adjustment tool serving for positioning the abutment part.

4. The linear drive unit as set forth in claim 1, wherein the abutment unit contains at least one of a buffer and a damping means.

5. The linear drive unit as set forth in claim 4, wherein the at least one of a buffer and a damping means possesses a force transmitting means extending concentrically through the abutment part.

6. The linear drive unit as set forth in claim 1, wherein the at least one drive means engages a transverse part which extends in the transverse direction of the section part between the two limbs of the section part and is anchored on the two limbs.

7. The linear drive unit as set forth in claim 1, wherein the second principal body, which is short in comparison with the overall length of the first principal body is overlapped on both mutually opposite end sides by the first principal body, and the drive means engages both axial terminal portions of the first principal body.

8. The linear drive unit as set forth in claim 1, wherein the two section elements are firmly joined together by bonding.

9. The linear drive unit as set forth in claim 1, wherein the linear guide means are designed in the form of rolling guides and possess guide tracks provided on each limb of the section part and on the facing side faces of the drive housing such tracks cooperating with the intermediately placed rolling elements.

10. The linear drive unit as set forth in claim 1, wherein linear guide means associated with a respective limb possess rolling elements fitted together as rolling units.

11. The linear drive unit as set forth in claim 1, wherein the two section elements are in cross section each L-like and with a mutual overlap of two first L-like limbs are firmly joined together.

12. The linear drive unit as set forth in claim 1, wherein the end faces aligned in the overlapping zone of the first L-like limbs do not engage the, respectively, other section element.

13. The linear drive unit as set forth in claim 1, wherein the housing contains two adjacently placed drive spaces for one respective drive means, the drive spaces preferably being in a common plane, which runs in parallelism to the plane of extent of the connection rig connecting the two limbs of the section part.

14. The linear drive unit as set forth in claim 13, wherein the two drive means engage on opposite axial terminal regions of the first principal body, each drive means only engaging at one axial terminal region.

15. The linear drive unit as set forth in claim 13, wherein each drive means is responsible for the production of the linear relative movement in only one of the two possible directions of movement.

16. The linear drive unit as set forth in claim 1, wherein the piston in the drive space delimits an actuating chamber on the side facing away from the force transmitting part, such chamber being able to be subjected to an actuating fluid via the piston and the force transmitting part in order to cause a linear relative movement between the two principal bodies.

17. The linear drive unit as set forth in claim 1, wherein the piston and the force transmitting part are designed in the form of an integral structural unit resembling a plunger piston.

18. A linear drive unit comprising a first principal body having a section part, which is U-like in cross section, a second principal body, which has a drive housing, said housing being placed at the U-like opening of the section part with the placement therebetween of linear guide means permitting a guided linear relative movement, and at least one drive space in the interior of the drive housing, such drive space containing components of a drive means projecting on at least one terminal side of the second principal body and engaging the associated axial terminal region of the first principal body, and on the activation thereof the linear relative movement is caused between the two principal bodies, wherein the section part of the first principal body straddles the drive housing of the second principal body so that its longitudinal limbs flank the lateral side faces of the drive housing, the linear guide means being arranged between each limb of the section part and the facing lateral face of the drive housing, and in the section part comprises two section elements which respectively comprise one of the limbs and are firmly fitted together so as to set the guide play of the linear drive means alongside each other, and wherein the at least one drive means engages a transverse part which extends in the transverse direction of the section part between the two limbs of the section part and is anchored on the two limbs, and wherein the transverse part is plate-like or block-like in design and is installed between the two limbs of the section part with a plane of extent perpendicular to the longitudinal axis of the first principal body.

19. The linear drive unit as set forth in claim 18, wherein the two section elements are firmly joined together by bonding.

20. The linear drive unit as set forth in claim 18, wherein the linear guide means are designed in the form of rolling guides and possess guide tracks provided on each limb of the section part and on the facing side faces of the drive housing such tracks cooperating with the intermediately placed rolling elements.

21. A linear drive unit comprising a first principal body having a section part, which is U-like in cross section, a second principal body, which has a drive housing, said housing being placed at the U-like opening of the section part with the placement therebetween of linear guide means permitting a guided linear relative movement, and at least one drive space in the interior of the drive housing, such drive space containing components of a drive means projecting on at least one terminal side of the second principal body and engaging the associated axial terminal region of the first principal body, and on the activation thereof the linear relative movement is caused between the two principal bodies, wherein the section part of the first principal body straddles the drive housing of the second principal body so that its longitudinal limbs flank the lateral side faces of the drive housing, the linear guide means being arranged between each limb of the section part and the facing lateral face of the drive housing, and in the section part comprises two section elements which respectively comprise one of the limbs and are firmly fitted together so as to set the guide play of the linear drive means alongside each other, and wherein the at least one drive means engages a transverse part which extends in the transverse direction of the section part between the two limbs of the section part and is anchored on the two limbs, and wherein the transverse part so interlocks with at least one of the limbs of the section part that between it and the section part in the directions of motion of the linear relative movement a play-free transmission of force is possible, and simultaneously on assembly of the section elements there is play for movement between the transverse part and the limbs in the transverse direction.

22. The linear drive unit as set forth in claim 21, wherein the two section elements are firmly joined together by bonding.

23. The linear drive unit as set forth in claim 21, wherein the linear guide means are designed in the form of rolling guides and possess guide tracks provided on each limb of the section part and on the facing side faces of the drive housing such tracks cooperating with the intermediately placed rolling elements.

24. A linear drive unit comprising a first principal body having a section part, which is U-like in cross section, a second principal body, which has a drive housing, said housing being placed at the U-like opening of the section part with the placement therebetween of linear guide means permitting a guided linear relative movement, and at least one drive space in the interior of the drive housing, such drive space containing components of a drive means projecting on at least one terminal side of the second principal body and engaging the associated axial terminal region of the first principal body, and on the activation thereof the linear relative movement is caused between the two principal bodies, wherein the section part of the first principal body straddles the drive housing of the second principal body so that its longitudinal limbs flank the lateral side faces of the drive housing, the linear guide means being arranged between each limb of the section part and the facing lateral face of the drive housing, and in the section part comprises two section elements which respectively comprise one of the limbs and are firmly fitted together so as to set the guide play of the linear drive means alongside each other, and wherein the at least one drive means engages a transverse part which extends in the transverse direction of the section part between the two limbs of the section part and is anchored on the two limbs, and wherein the transverse part is mounted for floating movement in the transverse direction of the section part on the section part.

25. The linear drive unit as set forth in claim 24, wherein the two section elements are firmly joined together by bonding.

\* \* \* \* \*